US007883412B2

(12) United States Patent
Daniel et al.

(10) Patent No.: US 7,883,412 B2
(45) Date of Patent: *Feb. 8, 2011

(54) COLLUSION DETECTION AND CONTROL

(75) Inventors: David A. Daniel, Rio de Janeiro (BR); Ricardo S. Pessanha, Rio de Janeiro (BR)

(73) Assignee: Waterleaf Limited (IM)

( * ) Notice: Subject to any disclaimer, the term of this patent is extended or adjusted under 35 U.S.C. 154(b) by 1358 days.

This patent is subject to a terminal disclaimer.

(21) Appl. No.: 10/537,051

(22) PCT Filed: Dec. 2, 2003

(86) PCT No.: PCT/US03/38068

§ 371 (c)(1), (2), (4) Date: Mar. 22, 2006

(87) PCT Pub. No.: WO2004/050201

PCT Pub. Date: Jun. 17, 2004

(65) Prior Publication Data

US 2006/0189381 A1 Aug. 24, 2006

(30) Foreign Application Priority Data

Dec. 4, 2002 (GB) ................................ 0228219.2

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/29; 463/16; 463/17; 463/18; 463/19; 463/20; 463/21; 463/22; 463/23; 463/24; 463/25; 463/30; 463/42; 700/91

(58) Field of Classification Search ............. 463/16–25, 463/29, 30, 42; 700/91
See application file for complete search history.

(56) References Cited

U.S. PATENT DOCUMENTS 4,531,187 A 7/1985 Uhland (Continued)

FOREIGN PATENT DOCUMENTS

WO 00/62880 A2 10/2000

(Continued)

OTHER PUBLICATIONS

Supplementary European Search Report from Related Application No. EP 03 79 0167, dated Apr. 18, 2007.

*Primary Examiner*—David L Lewis
*Assistant Examiner*—Adetokunbo Torimiro
(74) *Attorney, Agent, or Firm*—McDonnell Boehnen Hulbert & Berghoff LLP

(57) ABSTRACT

A system for detecting and controlling collusion in a game with a plurality of participating players includes a gaming server and a number of portals in the form of websites on the World Wide Web in the Internet. Each of the portal websites is an online casino website hosted on a corresponding casino web server (not shown). Each of the casino websites is accessible by one or more would-be poker players. Each player accesses the website using a computer with a display and an associated pointing device. The system further includes an administration facility, which communicates with the gaming server along a communication channel, and a collusion detection server in communication with the gaming server via the communication channel.

28 Claims, 2 Drawing Sheets

U.S. PATENT DOCUMENTS

| | | | | |
|---|---|---|---|---|
| 4,926,327 | A * | 5/1990 | Sidley | 463/13 |
| 5,819,226 | A | 10/1998 | Gopinathan et al. | |
| 6,104,815 | A * | 8/2000 | Alcorn et al. | 380/251 |
| 6,283,856 | B1 | 9/2001 | Mothwurf | |
| 6,460,848 | B1 | 10/2002 | Soltys et al. | |
| 6,516,056 | B1 | 2/2003 | Justice et al. | |
| 7,556,561 | B2 | 7/2009 | White et al. | |
| 7,604,541 | B2 | 10/2009 | Aikin et al. | |
| 2002/0103029 | A1 | 8/2002 | Finlayson et al. | |
| 2003/0097330 | A1 | 5/2003 | Hillmer et al. | |
| 2004/0242321 | A1 | 12/2004 | Overton | |
| 2006/0068870 | A1 | 3/2006 | Crawford et al. | |
| 2006/0068871 | A1 | 3/2006 | Crawford et al. | |
| 2008/0004107 | A1 | 1/2008 | Nguyen et al. | |
| 2008/0182644 | A1 | 7/2008 | Lutnick et al. | |
| 2009/0029766 | A1 | 1/2009 | Lutnick et al. | |
| 2009/0093300 | A1 | 4/2009 | Lutnick et al. | |

FOREIGN PATENT DOCUMENTS

| | | | |
|---|---|---|---|
| WO | 03/007254 | A2 | 1/2003 |

* cited by examiner

COLLUSION DETECTION AND CONTROL

FIELD OF THE INVENTION

This invention relates to a system for detecting and controlling collusion in a game, more specifically a zero-sum game and, in particular, to a system for detecting and controlling collusion in a game on which wagers may be placed such as, for example, multiplayer poker. The invention extends to a method for detecting and controlling collusion in a game.

BACKGROUND TO THE INVENTION

The invention will be described with particular reference to the detection and control of collusion in a game of multiplayer poker. It is to be clearly understood, however, that the scope of the invention is not limited to the detection and control of collusion in this particular game only.

The game of poker is widely played in many jurisdictions, particularly in the United States of America. A traditional game of poker is a multi-player game in which, during each turn of the game, the players compete against each other to win an accumulated jackpot ("the pot"), to which all the players have contributed to some extent by means of wagers. It is clear that the game is a zero-sum game, as the gain of the winner of the pot is equal to the accumulated losses of the other players in the game. It is, however, also known for a party who arranges or hosts a game of poker to levy a commission ("a rake") on the pot in order to derive revenue.

The game of poker is played at both land-based and on-line casinos, at the latter by means of a communication network such as the Internet.

Although there are many variations of the game of poker, the basic aim of the game is for each player to assemble five playing cards ("a hand") from a deck of cards and to wager that their hand will outrank those of the other players, according to predetermined criteria. Once the players' hands have been assembled and wagers placed, the respective hands are compared ("the show down") in order to determine the winning player, who wins the pot.

The winner is usually the player whose hand contains a highest-ranking desirable combination of five playing cards. The desirability of any combination of five playing cards in a hand is inversely proportional to the probability of assembling that particular combination of cards. Desirable combinations of playing cards are, given a standard deck of 52 playing cards, in order of increasing desirability: a pair of cards having the same rank ("one pair"); two pairs of cards in which the rank of each pair is different ("two pairs"); three cards having the same rank ("three of a kind"); "a straight" in which the five cards of a hand are in sequentially increasing rank order, with no restriction as to suite, "a flush" in which the five cards are all of the same suite; "a full house" in which three cards are each of the same rank, while the remaining two cards each have another identical rank; "four of a kind" in which four cards of the hand each have the same rank; "a straight flush" in which the five cards are in sequentially ascending rank order and are all of the same suite; and a "royal flush" in which the five cards are all of the same suite and are ranked Ace, King, Queen, Jack and 10. Where a deck is used that has fewer than 52 cards, the probability of assembling a full house is greater than that of being dealt a flush, making the latter combination of cards more desirable than the former.

The placement of wagers is achieved by one or more rounds of betting during the course of a turn of the game. The first player to act in a betting round can place a wager ("to bet"), withdraw from the turn of the game ("to fold"), or do nothing, merely passing the opportunity on to the next player ("to check"). After an initial bet, if there is one, the rest of the players, in turn, have the choices of increasing the size of the wager ("to raise"), folding, or matching the size of the previous wager ("to call"). A round of betting is completed when all the players who have not folded, and who will be referred to, for convenience, as the surviving players, have contributed the same amount to the pot. Any player who decides to fold does not participate any further in the particular turn of the game and forfeits all wagers he has made in that turn. To keep betting rounds from continuing indefinitely, it is customary for there to be at most three raises per betting round.

In each turn of the game, one player assumes the role of dealer of the playing cards. Betting is always done in a clockwise order. The first player to act is the one immediately clockwise of the dealer. Consequently, the dealer is the last to bet and, having seen the actions of the other players in the betting round, has access to the most information and is in a stronger position to the other players. For reasons of equity, the role of dealer passes to the next player in a clockwise direction after each turn of the game. When the game of poker is played in an on-line environment, the role of dealer is a symbolic one as dealing of cards is performed under software program control.

The size of bets or raises is determined by the rules of the game. A game of poker is characterised by the sizes of permissible bets. During the first two betting rounds, all bets and raises must be of a predetermined size ("the minimum bet") and must be of another, but greater, predetermined size ("the maximum bet") during the remaining betting rounds. Typically, the maximum bet is twice the minimum bet. A game in which the minimum bet is $5 and the maximum bet is $10 is characterised as a $5/$10 game.

At the start of a turn of the game, one or more players immediately clockwise of the dealer may be required to make bets ("blinds") without having seen any cards, in order to ensure that there is always something in the pot. As an alternative, each player may be required to make an initial wager of a predetermined size ("an ante").

It will be appreciated that the game of poker is a mixed game, combining elements of both chance and skill or strategy. It is known for two or more players in a poker game to co-ordinate their respective playing strategies in order to gain an advantage over the remaining players in the game, thereby destroying the fairness of the game.

Most variations of the game of poker fall into two main classes, namely draw poker and stud poker. In stud poker, one or more cards dealt to each player is visible to the other players in the game, while in draw poker, the cards in a players' hand are only revealed at the showdown stage of the game. Stud games also tend to have more betting rounds than draw poker, resulting in larger pots.

Within these two main classes, there are other variations that relate, mainly, to the steps by which a player may assemble five playing cards in order to obtain the highest possible ranking hand. It will be further appreciated that the detection collusion in a game of poker will depend, in part, upon the particular variation of the game being played. For the sake of clarity, the sequential steps relating to a number of the most popular variations of the game will be outlined below.

a) 5 Card Draw

1. Each player is dealt five cards face down
2. $1^{st}$ Betting round
3. Each player may discard any one or more cards in his hand and draw replacement cards with the goal of improving his hand ("the draw")
4. $2^{nd}$ Betting round
5. Showdown (highest ranking hand wins the pot)

b) 5 Card Stud

1. A first card is dealt face down to each player
2. A second card is dealt face up to each player
3. $1^{st}$ Betting round
4. A third card is dealt face up to each player
5. $2^{nd}$ Betting round
6. A fourth card is dealt face up to each player
7. $3^{rd}$ Betting round
8. A fifth card is dealt face up to each player
9. $4^{th}$ Betting round
10. Showdown (highest ranking hand wins the pot)

c) Texas Hold 'Em

1. A first two cards are dealt face down to each player ("hole cards")
2. $1^{st}$ Betting round
3. A first three community cards are dealt face up ("the flop")
4. $2^{nd}$ Betting round
5. A fourth community card is dealt face up ("the turn")
6. $3^{rd}$ betting round
7. A fifth and final community card is dealt face up ("the river")
8. $4^{th}$ Betting round
9. Showdown (highest ranking hand made up of any combination of a player's two hole cards and the five open community cards D) Omaha 1. Four hole cards are dealt face down to each player
2. $1^{st}$ Betting round
3. A first three community cards are dealt face up (the flop)
4. $2^{nd}$ betting round
5. A fourth community card is dealt face up (the turn)
6. $3^{rd}$ Betting round
7. A fifth and final community card is dealt face up (the river)
8. $4^{th}$ Betting round
9. Showdown (highest ranking hand made up of any combination of two hole cards and three open community cards)

e) Omaha Hi/Lo

The procedural rules of this variation of the game of poker are identical to those of the Omaha variation, with the exception that, at the showdown, the pot is split 50/50 between the highest ranking hand made up of any combination of a player's four hole cards and the three open community cards, and a best qualifying low hand. A low hand must be "8 or lower" to qualify, thus any hand that contains a 9 or higher cannot qualify as a low hand. The winning qualifying low hand is determined firstly by the player with the lowest high card. Upon a tie, the hand goes to the player with the next lowest high card. If there is no qualifying low hand, the high hand wins the entire pot.

f) 7 Card Stud

1. All players ante
2. Two hole cards are dealt face down to each player
3. A third card is dealt face up to each player (door card")

4. $1^{st}$ Betting round
5. A fourth card is dealt face up to each player ("Fourth Street")
6. $2^{nd}$ Betting round
7. A fifth card is dealt face up to each player ("Fifth Street")
8. $3^{rd}$ Betting round
9. A sixth card is dealt face up to each player ("Sixth Street")
10. $4^{th}$ Betting round
11. A seventh and last card is dealt face up to each player ("Seventh Street")
12. $5^{th}$ Betting round
13. Showdown (highest ranking hand made up of any combination of five of the player's seven cards On the first round of betting, the low card by suite is required to initiate action with a bet equal to half the lower table limit, the suites being ranked as spades, hearts, diamonds and clubs, from highest to lowest. On subsequent betting rounds, the highest exposed hand to date initiates betting action g) 7 Card Stud Hi/Lo The procedural rules of this variation of the game of poker are identical to those of the 7 Card Stud variation, with the exception that, at the showdown, the pot is split 50/50 between the best high hand and the best qualifying low hand. Each player can use any five cards in his hand for the high hand, and any five cards in his hand for the low hand.

h) Razz

The procedural rules of this variation of the game of poker are identical to those of the 7 Card Stud variation, with the exception that the lowest hand wins the pot. Each player can use any five of the seven cards in his hand for the low hand. Aces are low and straights and flushes have no effect on the value of the hand. The best possible low hand is 5-4-3-2-Ace.

i) Manila (2 Card)

This variation of the game of poker is played with a reduced deck of 32 cards (sevens to aces), accommodating a maximum of 11 players.

1. Two hole cards are dealt face down to each player
2. A first community card is dealt face up
3. $1^{st}$ Betting round
4. The next card in the deck is discarded ("burnt")
5. A second community card is dealt face up (Fourth Street)
6. $2^{nd}$ Betting round
7. The next card in the deck is burnt
8. A third community card is dealt face up (Fifth Street)
9. $3^{rd}$ Betting round
10. The next card in the deck is burnt
11. A fourth community card is dealt face up (Sixth Street)
12. $4^{th}$ Betting round
13. The next card in the deck is burnt
14. A fifth community card is dealt face up (Seventh Street)
15. $5^{th}$ Betting round
16. Showdown (highest ranking hand made up of a player's two hole cards and the five open community cards)

OBJECT OF THE INVENTION

It is an object of this invention to provide a system for detecting and controlling collusion in a game, and a method for detecting and controlling collusion in a game that will, at least partially, enable minimisation of any prejudice that such collusion can cause to non-colluding players in the game.

SUMMARY OF THE INVENTION

In accordance with this invention there is provided a system for detecting and controlling collusion in a game having a plurality of participating players, comprising:

recording means for recording, for each player, an amount wagered on each turn of the game in which the player participates, and a corresponding outcome of said wager, the outcome being a complete or partial forfeit of the wager if the wager is unsuccessful, and a profit made on the wager if the wager is successful; a ranking facility operable to derive a primary statistic for each player, the primary statistic being a function of a total number of turns of the game played by the player, and the outcomes of the wagers made by the player in these turns of the game; and monitoring means for monitoring the primary statistic of each player and generating an output when the primary statistic of any player changes by more than a predetermined amount, the output being an indicator of possible collusion by that player.

Further features of the invention provide for the system to include a storage means capable of storing the primary statistic for each player, for the primary statistic to be a ratio of a cumulative outcome of all the player's wagers and the number of turns of the game played by the player, and for the storage means to store a primary statistic for each player in respect of each one of a number of different levels of play of the game, a level of play being determined by wagering limits applicable to the game.

Still further features of the invention provide for the system to include a control facility operable to suspend a player for whom the monitoring means has generated an output, from any further participation in the game, for the system to include geo-location means for determining the geographical location of any participating player, for the control facility to suspend any two or more players for whom the monitoring facility has generated outputs and whose geographic locations are substantially identical, from any further participation in the game, alternatively for the control facility to prevent any two or more players for whom the monitoring facility has generated outputs and whose geographic locations are substantially identical, from participating in a same instance of the game.

Yet further features of the invention provide for the ranking facility to derive a number of secondary statistics relating to each player, for one secondary statistic to be, when the primary statistic relates to a winning player, a breakdown of that player's winnings from the other players, for a further secondary statistic to be, when the primary statistic relates to a losing player, a breakdown of that player's losses to other players, for the monitoring means to generate an output if a proportion of a player's winnings from another particular player exceed a predetermined threshold, for the monitoring means to generate an output if a proportion of a player's losses to another particular player exceed a predetermined threshold, and for the monitoring means to also generate an output for that particular player.

There also provided for the game to be a variation of the game of poker.

There is further provided for the variation to be any one of Texas Hold'Em, Omaha or Omaha Hi/Lo, for the secondary statistics to include any one or more of a win ratio for all hands played to the flop stage of the game, a win ratio for all hands played to the turn stage of the game, a win ratio for all hands played to the river stage of the game, a play decision ratio of the number of hands played to the flop stage and the number of hands played to the river stage of the game, a win ratio for all hands in which the player raises in early position, a win ratio for all hands in which the player raises in mid position, a win ratio for all hands in which the player raises in late position, and a raise ratio for all raising hands held by the player.

There is still further provided for the variation to be any one of Seven Card Stud, Seven Card Stud Hi/Lo or Razz, for the secondary statistics to include any one or more of a win ratio for all hands played to fourth street, a win ratio for all hands played to fifth street, a win ratio for all hands played to sixth street, a win ratio for all hands played to seventh street, a play decision ratio of the number of hands played to fourth street to the number of hands played to seventh street, and a raise ratio for all raising hands held by the player.

There is yet further provided for the variation to be Five Card Stud, for the secondary statistics to include any one or more of a win ratio for all hands played to the third street, a win ratio for all hands played to fourth street, a win ratio for all hands played to the fifth street, a play decision ratio of the number of hands played to third street to the number of hands played to fifth street, and a raise ratio for all raising hands held by the player.

There is also provided for the variation to be Five Card Draw, for the secondary statistics to include any one or more of a win ratio for all hands played to draw, and a raise ratio for all raising hands held by the player.

There is also provided for the variation to be Manila, for the secondary statistics to include any one or more of a win ratio for all hands played to fourth street, a win ratio for all hands played to fifth street, a win ratio for all hands played to sixth street, a win ratio for all hands played to seventh street, a play decision ratio of the number of hands played to fourth street to the number of hands played to seventh street, and a raise ratio for all raising hands held by the player.

The invention extends to a method for detecting and controlling collusion in a game having a plurality of participating players, comprising the steps of:

recording, for each player, an amount wagered on each turn of the game in which the player participates, and a corresponding outcome of said wager, the outcome being a complete or partial forfeit of the wager if the wager is unsuccessful, and a profit made on the wager if the wager is successful;

deriving a primary statistic for each player, the primary statistic being a function of a total number of turns of the game played by the player, and the outcomes of the wagers made by the player in these turns of the game; and monitoring the primary statistic of each player and generating an output when the primary statistic of any player changes by more than a predetermined amount, the output being an indicator of possible collusion by that player.

There is further provided for storing the primary statistic for each player on a storage means, for deriving the primary statistic as a ratio of a cumulative outcome of all the player's wagers and the number of turns of the game played by the player, and for storing in the storage means a primary statistic for each player in respect of each one of a number of different levels of play of the game, a level of play being determined by wagering limits applicable to the game.

There is still further provided for the method to include the step of suspending a player for whom an output has been generated, from any further participation in the game, for the method to include the further step of determining the geographical location of any participating player, for suspending any two or more players for whom outputs have been generated and whose geographic locations are substantially identical, from any further participation in the game, alternatively for preventing any two or more players for whom outputs have been generated outputs and whose geographic locations are substantially identical, from participating in a same instance of the game.

There is yet further provided for deriving a number of secondary statistics relating to each player, for one secondary statistic to be, when the primary statistic relates to a winning player, a breakdown of that player's winnings from the other players, for a further secondary statistic to be, when the primary statistic relates to a losing player, a breakdown of that player's losses to other players, for generating the output if a proportion of a player's winnings from another particular player exceed a predetermined threshold, for generating the output if a proportion of a player's losses to another particular player exceed a predetermined threshold, and for also generating an output for that particular player.

There also provided for the game to be a variation of the game of poker.

There is also provided for the variation to be any one of Texas Hold'Em, Omaha or Omaha Hi/Lo, for deriving the secondary statistics as any one or more of a win ratio for all hands played to the flop stage of the game, a win ratio for all hands played to the turn stage of the game, a win ratio for all hands played to the river stage of the game, a play decision ratio of the number of hands played to the flop stage and the number of hands played to the river stage of the game, a win ratio for all hands in which the player raises in early position, a win ratio for all hands in which the player raises in mid position, a win ratio for all hands in which the player raises in late position, and a raise ratio for all raising hands held by the player.

There is also provided for the variation to be any one of Seven Card Stud, Seven Card Stud Hi/Lo or Razz, for deriving the secondary statistics as any one or more of a win ratio for all hands played to fourth street, a win ratio for all hands played to fifth street, a win ratio for all hands played to sixth street, a win ratio for all hands played to seventh street, a play decision ratio of the number of hands played to fourth street to the number of hands played to seventh street, and a raise ratio for all raising hands held by the player.

There is also provided for the variation to be Five Card Stud, for deriving the secondary statistics as any one or more of a win ratio for all hands played to the third street, a win ratio for all hands played to fourth street, a win ratio for all hands played to the fifth street, a play decision ratio of the number of hands played to third street to the number of hands played to fifth street, and a raise ratio for all raising hands held by the player.

There is also provided for the variation to be Five Card Draw, for deriving the secondary statistics as any one or more of a win ratio for all hands played to draw, and a raise ratio for all raising hands held by the player.

There is also provided for the variation to be Manila, for deriving the secondary statistics as any one or more of a win ratio for all hands played to fourth street, a win ratio for all hands played to fifth street, a win ratio for all hands played to sixth street, a win ratio for all hands played to seventh street, a play decision ratio of the number of hands played to fourth street to the number of hands played to seventh street, and a raise ratio for all raising hands held by the player.

BRIEF DESCRIPTION OF THE DRAWINGS

One embodiment of the invention is described below, by way of example only, and with reference to the abovementioned drawings, in which.

DETAILED DESCRIPTION OF THE INVENTION

This embodiment of the invention will be described with particular reference to a system for detecting and controlling collusion in a game of poker. It is to be clearly understood, however, that the scope of this invention is not limited to this particular application.

Figure 1:
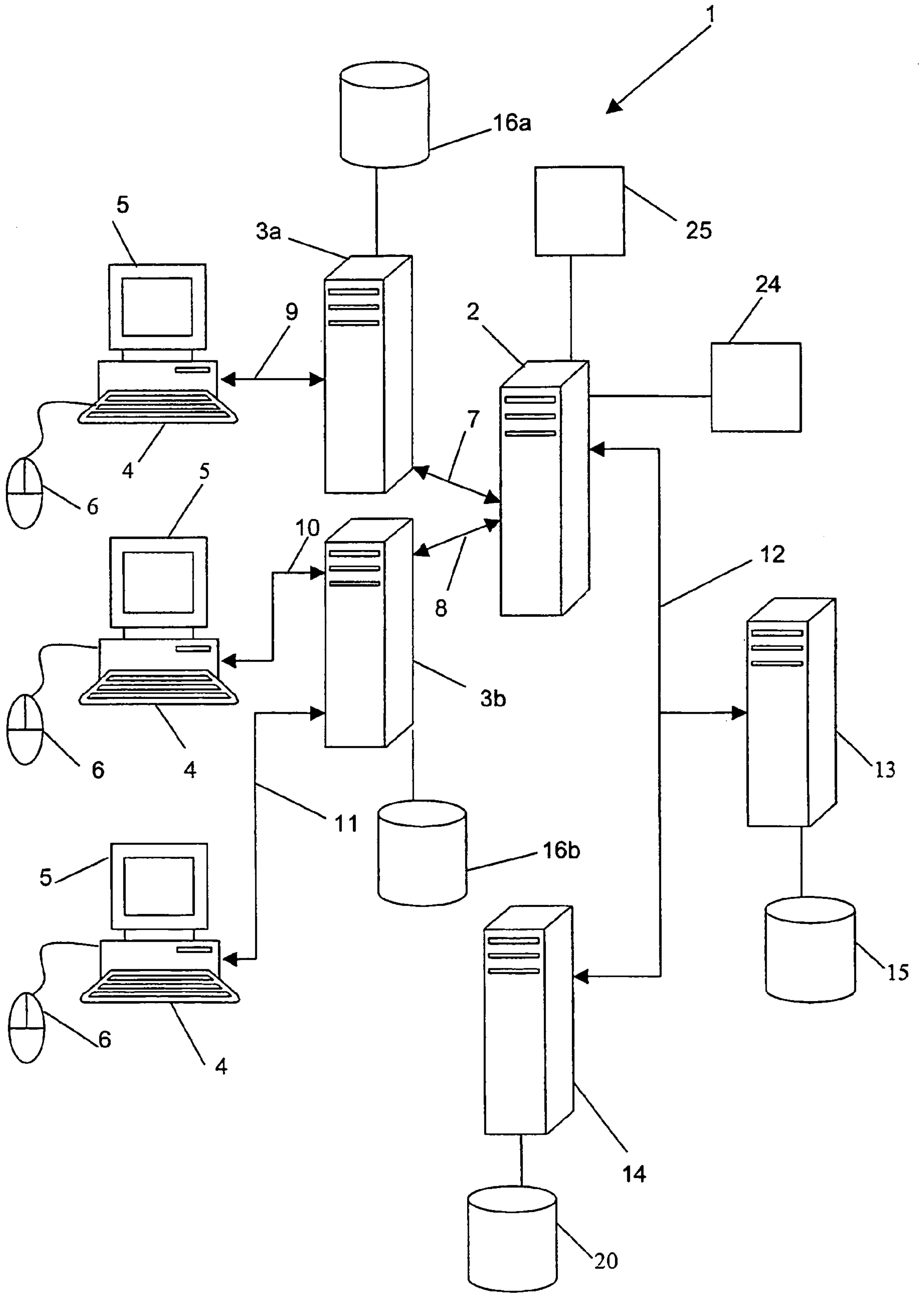
FIG. 1 is a schematic representation of a system for detecting and controlling collusion in a game, according to the invention.

Referring to FIG. 1, a system for detecting and controlling collusion in a game of poker is indicted generally by reference numeral (1). The system (1) includes a gaming server (2) and a number of portals (3*a*, 3*b*) in the form of websites on the World Wide Web of the Internet. In this embodiment, each one of the portal websites is an online casino website hosted on a corresponding casino web server (not shown). For convenience, this particular embodiment of the invention will be described with particular reference to only two such online casino websites (3*a*, 3*b*). Each one of the casino websites (3*a*, 3*b*) is accessible by one or more would-be poker players (not shown). Each would-be poker player accesses a casino website by means of a corresponding Internet-enabled computer workstation having a display (5) and an associated pointing device (6), such a mouse or, alternatively, a touchpad. In this embodiment, casino website (3*a*) is shown as having one computer workstation (4) logically connected thereto, whereas casino website (3*b*) is shown as being logically connected to two such computer workstations. It will be appreciated by those skilled in the art that such online casino websites (3*a*, 3*b*) can be logically connected to any number of computer workstations (4) simultaneously, which number is physically limited only by considerations of processing power and Internet access bandwidth.

The system (1) includes, further an administration facility (13) in the form of an application web server, which is communicable with the gaming server (2) along a communication channel (12). The detailed operation of the application web server (13) will be outlined in the description that follows. The system (1) also includes a collusion detection server (14) that is communicable with the gaming server (2) along the communication channel (12).

The gaming server (2), the online casino web servers (not shown) corresponding to the online casino websites (3*a*, 3*b*), the computer workstations (4), the application web server (13) and the collusion detection server (14) are capable of communicating with each other by means of an open communication channel that is, in this embodiment, the Internet. Although the Internet is a single packet-switched communication network, it represented in FIG. 1, for convenience, as separate logical communication channels (7,8, 9, 10, 11 and 12).

The application web server (13) maintains a clearing account facility (15) that has a clearing account corresponding to each one of the casino websites (3*a*, 3*b*). Analogously, each online casino web server (3*a*, 3*b*) includes a corresponding credit account facility (16*a*, 16*b*) with a credit account corresponding to each player who participates in the game of poker through one of the computer workstations (4). In the illustrated embodiment, the credit account facility (16*a*) therefore has one player account associated with it, while credit account facility (16*b*) has two associated player credit accounts.

The gaming server (2) operates under control of a stored program capable of enabling a predetermined maximum number, say 8, of players to participate in an instance of the game of poker. When the number of players reaches this predetermined maximum number, the stored program causes a further instance of the game to be initiated, the new instance also being capable of accommodating a further 8 players. In addition, the stored program initiates different instances of the game for each one of a number of different levels of play that are, in this embodiment, $1/$2, $2/$4, $5/$10, $10/$20, $20/$40, fixed limit games over $20/$40, and pot limit games. In this manner the gaming server is capable, under stored program control, of spawning as many separate instances of the game as required in order to accommodate the requirement of a pool of players who desire to play the game at different levels of play, in groups of a maximum of 8. Each instance of the game spawned in this manner is treated as totally independent of the other instances.

The online casino websites (3*a*, 3*b*) enable a player desiring to join the game to request, by means of one of the computer workstations (4), participation in the game and, once admitted to a particular instance of the game, to place a wager on a turn of that instance. Each participating player is presented with an identical graphical user interface (GUI) on the display (5) of his respective computer workstation (4) by the stored program in the gaming server (2). The GUI presents to the player a suitable display of a poker game (not shown) with appropriate icons that enable the player to make his own desired game play decisions and to monitor the progress of the game by viewing the game play decisions of the other participating players in the same instance of the game.

Figure 2:
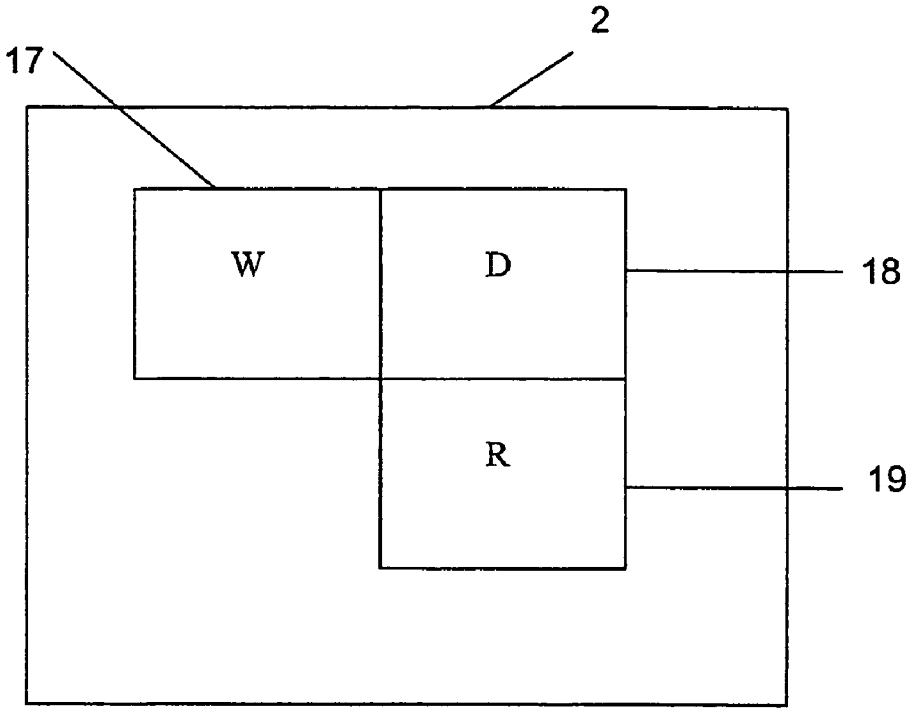
FIG. 2 is a functional representation of a stored software program of the application web server (13) of FIG. 1.

As shown in FIG. 2, the stored program also provides a wagering means (17) operable by any participating player to place a wager on a turn of the game, as well as a discrimination means (18) capable of determining whether any wager placed by any one of the participating players on the turn of the instance of the game of poker is successful or unsuccessful. The stored program in the gaming server (2) also maintains a dynamic register (19) of all players admitted to, and actively participating in, all the spawned instances of the poker from time to time, together with data representative of a corresponding portal (3*a*, 3*b*) through which each participating player accessed the game. The dynamic register (19) also contains data representative of an instance of the game in which the player is participating. The application web server (13) also settles the wagers of the participating players after completion of every turn of all instances of the game.

In use, a player wishing to participate in the game of poker uses a computer workstation (4) to access an online casino website (3*a*, 3*b*) of his choice. The player is presented with an icon (not shown) on the GUI on his computer workstation (4), which the user can activate in order to request participation in the poker game at a desired level of play. The user's request for participation is passed by the online casino website (3*a*, 3*b*) to the gaming server (2), which adjudicates and processes the request in the following manner:

1. if all existing instances of the poker game at the desired level of play are currently being played by 8 players, the existing instances of the game are all fully occupied and the would-be player cannot be admitted. The user is notified of the situation and is prompted to join a waiting list of would-be players;
2. if any one of the existing instances of the poker game at the desired level of play does have a vacancy, the would-be player is removed from the waiting list and admitted to that instance of the game and an appropriate GUI is presented to the newly-admitted player to allow him to play the game and to place wagers thereon;
3. the register of active participating players is updated to include the details of the newly-admitted player, together with data representative of the online casino website (3*a* or 3*b*) from which the player was admitted to the game, as well as the particular instance of the game to which he has been admitted;
4. when the waiting list of would-be players at any particular level of play has grown sufficiently large, say 4 or 5, the gaming server spawns a new instance of the game at that level of play to accommodate the would-be players in the waiting list, and the list is flushed; and
5. the register of active participating players is updated to include the details of all the newly-admitted players in the newly-spawned instance of the game, together with data representative of an online casino website (3*a* or 3*b*) from which the players were admitted to the game, as well as the particular instance of the game to which the players have been admitted.

Any player is able to leave the instance of the poker game in which he is participating at any time upon completion of a turn of that instance of the game. When a participating player leaves an instance of the poker game, the player's departure results in the following actions:

1. the GUI corresponding to the poker game on the computer workstation is replaced by one allowing the player to select another casino game to play;
2. the departing player's details are removed from the register of active participating players; and
3. the remaining instances of the game are analysed in order to collapse any sparsely populated instances of the game and to consolidate the participating players in these instances into a single more densely-populated instance of the game.

The participating players in any instance of the game utilise the wagering means (17) to place wagers from time to time on a turn of the poker game and to effect playing decisions required during the progress of the turn, as described above. Once the turn of the game has been completed, the discrimination means (18) determines which of the players is the winner of the turn and the application web server (13) settles the wagers placed by the participating players on that turn of the instance of the game, as follows:

1. the gaming server (2) notifies an online casino website (3*a*, 3*b*) associated with each player who has made a wager on the turn of the game. Each online casino website (3*a*,3*b*) then debits the individual credit account of its associated player by an amount equivalent to the magnitude of that player's wager;
2. the clearing account of an online casino website (3*a*, 3*b*) associated with each player who has made a wager on the turn of the game is then debited by an amount equivalent to the magnitude of that player's corresponding wager;
3. the clearing account of an online casino website (3*a*, 3*b*) associated with the player who has made the successful wager on the turn of the game is credited by an amount equivalent to the total of all the wagers inclusive of the successful wager; and 4. the gaming server (2) also notifies the online casino website (3*a*, 3*b*) associated with the successful player and that online casino website credits the individual credit account of the successful player by an amount equivalent to the total of all the wagers inclusive of the successful wager.

It is anticipated that the wagers placed by the participating players in the game will be made with credit purchased by such players prior to their participation in the game. For this purpose each online casino (3*a*, 3*b*) includes credit-dispensing means (not shown) capable of dispensing credit to any player who wishes to participate in the poker game. The player may purchase credit by means of conventional credit or debit card payment facilities that are well known in the art and that will not be described here in detail. Whenever a player purchases credit from the credit dispensing means, the corresponding online casino (3*a*, 3*b*) credits that player's credit account with an amount equivalent to the quantity of credit purchased by the player.

The above embodiment of the invention does not provide any compensation for an operator of the gaming server (2) who provides the participating players with a facility to play the poker game, or for the online casino websites (3*a*, 3*b*) that make their players available to the gaming server (2) for establishment of the poker game. In a variation of the above embodiment, the application server (13) withholds a portion of the total of all the wagers on each turn of the game as a rake for the benefit of the operator of the gaming server (2) and the online casino websites (3*a*, 3*b*). A portion of the rake is credited to the clearing account of each of the online casinos (3*a*, 3*b*) as a function of the proportion of players participating in the turn of the instance of the game through that particular casino website. In this variation of the embodiment, the clearing account of the casino (3*a* or 3*b*) associated with the player who has made a successful wager on the turn of the game is credited with an amount equivalent to the total of all the wagers inclusive of the successful wager, less the amount of the rake. Analogously, the credit account of the player who has made the successful wager is credited by an amount equivalent to the total of all the wagers, inclusive of the successful wager, less the rake.

The collusion detection server (14) maintains a recording means in the form of a collusion detection database (20), the function of which will be described in greater detail below. The collusion detection server (14) operates under control of a stored program capable of logging the playing history of each player who participates an instance of the game of poker at some time. The playing history includes an amount wagered on each turn of the game in which the player has participated, as well as a corresponding outcome of the wager. The outcome of the wager is taken to be a profit made on the wager, if successful, and an amount of the wager that is forfeited by the player if the wager is unsuccessful. In this particular embodiment, the outcome of the successful wager is thus the total of all the wagers by the participating players in the turn of the instance of the game of poker, less the amount wagered by the winning player, less the amount of the rake. The logged information is recorded in the collusion detection database (20).

Figure 3:
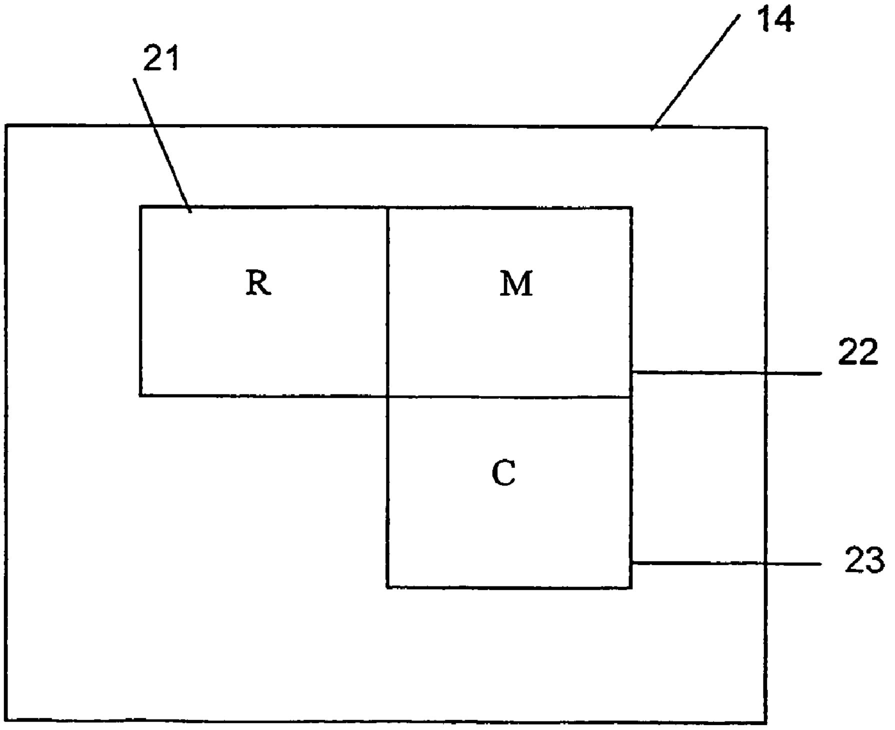
FIG. 3 is a functional representation of a stored software program of the collusion detection server 14) of FIG. 1.

As shown in FIG. 3, the stored program in the collusion detection server (14) provides a ranking facility (21) that is operable to derive from the logged playing history of each player, a corresponding primary statistic. A player's primary statistic is re-calculated by the ranking facility (21) each time the player's playing history is updated with the outcome of a further turn of the game in which the player has participated. The derived primary statistic is stored in the collusion detection database (20). The primary statistic is a player's win/loss ratio over all turns played by the player, which is calculated as:

$$\text{win/loss (all hands played)} = \frac{\text{Units} + / -}{na}$$

where: Units+/−=sum of the outcomes of all the wagers; and na=number of hands played by the player.

The stored program in the collusion detection server (14) also provides a monitoring means (22) for continuously monitoring the primary statistic of any player in the collusion detection database (20). The monitoring means (21) generates an output in the form of a flag when the primary statistic of any player changes by more than a predetermined threshold. Such a change indicates a change in that player's pattern of play and this may serve as an indicator of possible collusion by that player that is worthy of further investigation. In order to minimise the possibility of generating spurious flags, the ranking facility (21) derives the primary statistic for a player once a playing history exceeding 300 turns of the game has been logged in the collusion detection server (14). It is anticipated that a particular player's win/loss ratio will differ according to a level at which the game is played, the player being more cautious when playing the game at a high level. For this reason, the ranking facility (21) computes a primary statistic for each player for each level at which the game may be played. In this instance, the levels of play are: games up to $1/$2, games from $2/$4 to $5/$10, games from $10/$20 to $20/$40, fixed limit games over $20/$40, Pot Limit games, and No Limit games. Thus a primary statistic for a particular level of play will only be derived by the ranking facility (21) when a playing history of 300 turns of the game has been logged for that particular level of play.

The stored program in the collusion detection server (14) also provides a control facility (23) that acts on the flag generated by the monitoring means (21) by suspending the corresponding player from further participation in the game of poker.

The ranking facility (21) also computes a number of secondary statistics relating to each player. When the primary statistic has a positive value, indicating a winning player, a first secondary statistic is a breakdown of that player's winnings from the other players in the instance of the game. If an inordinate percentage of that player's winnings is derived from one or more other players, the monitoring means (22) generates a flag. Such a skewed pattern of winnings is a further indicator of possible collusion by the winning player.

A further secondary statistic, which is computed when the primary statistic for a player is negative, indicating a losing player, is a breakdown of that player's losses to the other players in the instance of the game. If an inordinate percentage of that player's losses are made to one or more other players, the monitoring means (22) generates a flag.

A still further secondary statistic is computed as:

$$\text{raises with/without a Raising Hand} = R/RH$$

where: R=total number of raises; and

RH=number of raising hands

Each game play decision by a player to raise a prior wager is analysed by an analysis facility (24) connected to the gaming server (2). The analysis facility (24) evaluates whether the game play decision was optimal in the light of the cards in the players hand. A ratio close to 1 indicates that the player is raising correctly. A ratio significantly greater than 1 means that the player is raising too often with hands that are not adjudged to be raising hands. This indicates that the player is a poor player, or a colluder, and a flag is raised by the monitoring means (22).

As a yet further statistic, a player's losses arising from all raises are broken down and analysed. An inordinately high proportion of losses to one or more other participating players causes the monitoring means (22) to raise a flag.

It is anticipated that the two previous secondary statistics can be advantageously employed to quickly analyse a new participating player. With a logged playing history of only 20 or 30 turns of the game, these secondary statistics will be accurate enough to enable the monitoring means (22) to raise a flag, when required.

The ranking facility (21) also computes further secondary statistics as a function of a variation of poker that is being played in the particular instance of the game.

Where the variation of poker being played is any one of Texas Hold'Em, Omaha or Omaha Hi/Lo, the following additional secondary statistics are computed:

$$\text{1. win/loss (hands played to Flop)} = \frac{\text{Units} +/-}{nf}$$

where: nf=number of hands played to Flop

A positive win/loss ratio indicates that the player is making good decisions about which cards to call before the Flop. A big negative win/loss ratio indicates that the player is seeing too many Flops, which could be the result of getting good hole cards but no help from the Flops, or the player could be setting up bets and raises for another participating player, indicating collusion. In this instance, the monitoring means (22) generates a flag.

$$\text{2. win/loss (hands played to Turn)} = \frac{\text{Units} +/-}{nt}$$

where: nt=number of hands played to Turn

As above, the monitoring means (22) generates a flag if this particular secondary statistic is smaller than a predetermined negative threshold.

$$\text{3. win/loss (hands played to River)} = \frac{\text{Units} +/-}{nr}$$

where: nr=number of hands played to River

As above, the monitoring means (22) generates a flag if this particular secondary statistic is smaller than a predetermined negative threshold.

$$\text{4. Play Decision ratio} = \frac{nf}{nr}$$

$$\text{5. win/loss (raises in Early Position)} = \frac{\text{Units} +/-}{nre}$$

where: nre=number of raises in early position

A good player should show a significant win ratio when raising in an early position. A bad or colluding player should show significant losses. Thus the monitoring means (22) will generate a flag when this secondary statistic is smaller than a predetermined negative threshold.

6. The player's losses or winnings arising from raises in Early Position are broken down and analysed. An inordinately high proportion of losses to or winnings from one or more other participating players causes the monitoring means (22) to raise a flag.

$$\text{7. win/loss (raises in Mid Position)} = \frac{\text{Units} +/-}{nrm}$$

where: nrm=number of raises in mid position

A good player should show a significant win ratio when raising in a mid position. A bad or colluding player should show significant losses. Thus the monitoring means (22) will generate a flag when this secondary statistic is smaller than a predetermined negative threshold $$\text{8. win/loss (raises in Late Position)} = \frac{\text{Units} +/-}{nrl}$$

where: nrl=number of raises in late position

A good player should show a significant win ratio when raising in a late position. A bad or colluding player should show significant losses. Thus the monitoring means (22) will generate a flag when this secondary statistic is smaller than a predetermined negative threshold.

Where the variation of poker being played is any one of Seven Card Stud, Seven Card Stud Hi/Lo or Razz, the following additional secondary statistics are computed:

$$\text{1. win/loss (hands played to } 4^{th} \text{ Street)} = \frac{\text{Units} +/-}{n4}$$

where: n4=number of hands played to $4^{th}$ Street

The monitoring means (22) generates a flag if this particular secondary statistic is smaller than a predetermined negative threshold.

$$\text{2. win/loss (hands played to } 5^{th} \text{ Street)} = \frac{\text{Units} +/-}{n5}$$

where: n5=number of hands played to $5^{th}$ Street

The monitoring means (22) generates a flag if this particular secondary statistic is smaller than a predetermined negative threshold.

$$\text{3. win/loss (hands played to } 6^{th} \text{ Street)} = \frac{\text{Units} +/-}{n6}$$

where: n6=number of hands played to $6^{th}$ Street

The monitoring means (22) generates a flag if this particular secondary statistic is smaller than a predetermined negative threshold.

$$4.\ \text{win/loss (hands played to } 7^{th} \text{ Street)} = \frac{\text{Units} +/-}{n7}$$

where: n7=number of hands played to $7^{th}$ Street

The monitoring means (22) generates a flag if this particular secondary statistic is smaller than a predetermined negative threshold.

Where the variation of poker being played is Five Card Stud, the following additional secondary statistics are computed:

$$1.\ \text{win/loss (hands played to } 3^{rd} \text{ Street)} = \frac{\text{Units} +/-}{n3}$$

where: n3=number of hands played to $3^{rd}$ Street

The monitoring means (22) generates a flag if this particular secondary statistic is smaller than a predetermined negative threshold.

$$2.\ \text{win/loss (hands played to } 4^{th} \text{ Street)} = \frac{\text{Units} +/-}{n4}$$

The monitoring means (22) generates a flag if this particular secondary statistic is smaller than a predetermined negative threshold.

$$3.\ \text{win/loss (hands played to } 5^{th} \text{ Street)} = \frac{\text{Units} +/-}{n5}$$

The monitoring means (22) generates a flag if this particular secondary statistic is smaller than a predetermined negative threshold.

Where the variation of poker being played is Five Card Draw, the following additional secondary statistic is computed:

$$1.\ \text{win/loss (hands played to Draw)} = \frac{\text{Units} +/-}{nd}$$

where: nd=number of hands played to Draw

The monitoring means (22) generates a flag if this particular secondary statistic is smaller than a predetermined negative threshold.

Where the variation of poker being played is Manila, the following additional secondary statistics are computed:

$$1.\ \text{win/loss (hands played to } 4^{th} \text{ Street)} = \frac{\text{Units} +/-}{n4}$$

The monitoring means (not shown) generates a flag if this particular secondary statistic is smaller than a predetermined negative threshold.

$$2.\ \text{win/loss (hands played to } 5^{th} \text{ Street)} = \frac{\text{Units} +/-}{n5}$$

The monitoring means (22) generates a flag if this particular secondary statistic is smaller than a predetermined negative threshold.

$$3.\ \text{win/loss (hands played to } 6^{th} \text{ Street)} = \frac{\text{Units} +/-}{n6}$$

The monitoring means (22) generates a flag if this particular secondary statistic is smaller than a predetermined negative threshold.

$$4.\ \text{win/loss (hands played to } 7^{th} \text{ Street)} = \frac{\text{Units} +/-}{n7}$$

The monitoring means (22) generates a flag if this particular secondary statistic is smaller than a predetermined negative threshold.

$$5.\ \text{Play Decision ratio} = \frac{n4}{n7}$$

It will be appreciated by those skilled in the art that the system (1) enables potentially fraudulent circumstances arising out of collusive play by any player to be flagged. The system (1) is then able to control the potential fraud by suspending the player from any further participation in the game. There exists a possibility, however, that such a player may have been flagged because his playing pattern arises not from collusive play, but rather from bad or unskilled play. In this instance, it is undesirable to suspend such a player from further participation in the game.

In order to prevent unwarranted suspension of non-colluding players, the system (1) may include a geo-location means (25). The geo-location means (25) is well known in the art and will not be described here in detail. Whenever a player accesses one of the online casino websites (3*a*, 3*b*) by means of the Internet, the player's Internet Protocol address is submitted by the corresponding casino web server (not shown) to the geo-location means (25), which returns to the casino web server a geographical location of the player. The geographical location of each participating player is passed to the collusion detection server (14) where it is stored in the collusion detection database (20) together with the player's playing history.

Knowledge of the geographical location of a player can reduce the instances of incorrect suspension of a suspected colluding player. For example, the control facility may suspend any two or more players for whom the monitoring facility (not shown) has generated flags and whose geographical locations are substantially identical. Alternatively, the control facility may prevent any two or more players for whom the monitoring facility has generated outputs and whose geographical locations are substantially identical, from participating in the same instance of the game of poker.

Numerous modifications are possible to this embodiment without departing from the scope of the invention. In particular, the gaming server (2) may be directly accessible by all players through a single portal such as a poker room where poker is the only game available to would-be players, instead of through a plurality of different online casino websites (3*a*, 3*b*). In this variation of the embodiment the necessity for the clearing account facility (15) and the separate clearing account for each one of the casino websites fall away.

Further, the control facility may be dispensed with, resulting in all instances of suspected collusion that are flagged requiring further investigation by a supervisor. The supervisor is then required to decide in each case whether a player is to be suspended from play, or not.

Still further, the system (1) may be applied to any multiplayer zero-sum game on which participating players may place wagers. Further examples of such games are backgammon, bridge, gin, rummy, canasta, whist or mah-jong.

The technical problem solved by this invention is that of providing system capability to detect collusive play in multiplayer distributed online games. The system capability also solves the technical problem of preventing collusive play, after detection thereof, by automatically initiating remedial action, such as suspension or separation of colluding players who are participating in the game. The system ensures and promotes the fairness of the game.

The invention therefore provides a system and a method for detecting and controlling collusive play in multiplayer games.

The invention claimed is:

1. A system for detecting and controlling collusion in a game having a plurality of participating players comprising:

means for recording, for each player, an amount wagered on each turn of the game in which the player participates, and a corresponding outcome of said wager, the outcome being a complete or partial forfeit of the wager if the wager is unsuccessful, and a profit made on the wager if the wager is successful;

a ranking facility operable to derive a primary statistic for each player as a function of a total number of turns of the game played by the player and the outcomes of the wagers made by the player in these turns of the game, wherein the primary statistic is a ratio of a cumulative outcome of the player's wagers and the total number of turns of the game played by the player; and monitoring means for monitoring the primary statistic of each player and generating an output when the primary statistic of any player changes by more than a predetermined amount, the output being an indicator of possible collusion by that player.

2. The system as claimed in claim 1 which includes a storage means capable of storing the primary statistic for each player in respect of each one of a number of different levels of play of the game, a level of play being determined by wagering limits applicable to the game.

3. The system as claimed in claim 1 that includes a control facility operable to suspend a player for whom the monitoring means has generated an output, from any further participation in the game.

4. The system as claimed in claim 3 that includes geolocation means for determining the geographical location of any participating player, the control facility being operable to suspend any two or more players for whom the monitoring facility has generated outputs and whose geographic locations are substantially identical, from any further participation in the game.

5. The system as claimed in claim 4 in which the control facility is operable to prevent any two or more players for whom the monitoring facility has generated outputs and whose geographic locations are substantially identical, from participating in a same instance of the game.

6. The system as claimed in claim 1 in which the ranking facility derives a number of secondary statistics relating to each player.

7. The system as claimed in claim 6 in which one secondary statistic is, when relating to a winning player, a breakdown of that player's winnings from the other players and in which the monitoring means generates an output if a proportion of a player's winnings from another particular player exceeds a predetermined threshold, and also generates an output for the other particular player.

8. The system as claimed in claim 7 in which a further secondary statistic is, when relating to a losing player, a breakdown of that player's losses to other players, and in which the monitoring means generates an output if a proportion of a player's losses to another particular player exceeds a predetermined threshold, and also generates an output for the other particular player.

9. The system as claimed in claim 6 in which the game is a variation of the game of poker.

10. The system as claimed in claim 9 in which the variation is any one of Texas Hold'Em, Omaha or Omaha Hi/Lo and in which the number of secondary statistics includes any one or more of a win ratio for all hands played to the flop stage of the game, a win ratio for all hands played to the turn stage of the game, a win ratio for all hands played to the river stage of the game, a play decision ratio of the number of hands played to the flop stage and the number of hands played to the river stage of the game, a win ratio for all hands in which the player raises in early position, a win ratio for all hands in which the player raises in mid position, a win ratio for all hands in which the player raises in late position, and a raise ratio for all raising hands held by the player.

11. The system as claimed in claim 9 in which the variation is any one of Seven Card Stud, Seven Card Stud Hi/Lo or Razz and in which the number of secondary statistics includes any one or more of a win ratio for all hands played to fourth street, a win ratio for all hands played to fifth street, a win ratio for all hands played to sixth street, a win ratio for all hands played to seventh street, a play decision ratio of the number of hands played to fourth street to the number of hands played to seventh street, and a raise ratio for all raising hands held by the player.

12. The system as claimed in claim 9 in which the variation is Five Card Stud and in which the number of secondary statistics includes any one or more of a win ratio for all hands played to the third street, a win ratio for all hands played to fourth street, a win ratio for all hands played to the fifth street, a play decision ratio of the number of hands played to third street to the number of hands played to fifth street, and a raise ratio for all raising hands held by the player.

13. The system as claimed in claim 9 in which the variation is Five Card Draw and in which the number of secondary statistics includes any one or more of a win ratio for all hands played to draw, and a raise ratio for all raising hands held by the player.

14. The system as claimed in claim 9 in which the variation is Manila and in which the number of secondary statistics includes any one or more of a win ratio for all hands played to fourth street, a win ratio for all hands played to fifth street, a win ratio for all hands played to sixth street, a win ratio for all hands played to seventh street, a play decision ratio of the number of hands played to fourth street to the number of hands played to seventh street, and a raise ratio for all raising hands held by the player.

15. A method for detecting and controlling collusion in a game having a plurality of participating players, comprising the steps of:

recording, for each player, an amount wagered on each turn of the game in which the player participates, and a corresponding outcome of said wager, the outcome being a complete or partial forfeit of the wager if the wager is unsuccessful, and a profit made on the wager if the wager is successful;

a collusion detection server deriving a primary statistic for each player, wherein the primary statistic is a function of a total number of turns of the game played by the player, and the outcomes of the wagers made by the player in these turns of the game, wherein the primary statistic is derived as a ratio of a cumulative outcome of the player's wagers and the total number of turns of the game played by the player; and the collusion detection server monitoring the primary statistic of each player and generating an output when the primary statistic of any player changes by more than a predetermined amount, the output being an indicator of possible collusion by that player.

16. The method as claimed in claim 15 in which a primary statistic for each player is stored in a storage means in respect of each one of a number of different levels of play of the game, a level of play being determined by wagering limits applicable to the game.

17. The method as claimed in claim 15 that includes the step of suspending a player for whom an output has been generated, from any further participation in the game.

18. The method as claimed in claim 17 that includes a further step of determining the geographical location of any participating player and suspending and two or more players for whom outputs have been generated and whose geographic locations are substantially identical from any further participation in the game.

19. The method as claimed in claim 18 in which any two or more players for whom outputs have been generated and whose geographic locations are substantially identical, are prevented from participating in a same instance of the game.

20. The method as claimed in claim 15 that includes a step of deriving a number of secondary statistics relating to each player.

21. The method as claimed in claim 20 in which one secondary statistic, when relating to a winning player, is a breakdown of that player's winnings from the other players, and that includes the steps of generating an output if a proportion of a player's winnings from another particular player exceeds a predetermined threshold, and generating an output for the other particular player.

22. The method as claimed in claim 21 in which a further secondary statistic, when relating to a losing player, is a breakdown of that player's losses to other players, and that includes the steps of generating an output if a proportion of a player's losses to another particular player exceeds a predetermined threshold, and generating an output for the other particular player.

23. The method as claimed in claim 20 in which the game is a variation of the game of poker.

24. The method as claimed in claim 23 in which the variation is any one of Texas Hold'Em, Omaha or Omaha Hi/Lo and in which the number of secondary statistics is derived as any one or more of a win ratio for all hands played to the flop stage of the game, a win ratio for all hands played to the turn stage of the game, a win ratio for all hands played to the river stage of the game, a play decision ratio of the number of hands played to the flop stage and the number of hands played to the river stage of the game, a win ratio for all hands in which the player raises in early position, a win ratio for all hands in which the player raises in mid position, a win ratio for all hands in which the player raises in late position, and a raise ratio for all raising hands held by the player.

25. The method as claimed in claim 23 in which the variation is any one of Seven Card Stud, Seven Card Stud Hi/Lo or Razz and in which the number of secondary statistics is derived as any one or more of a win ratio for all hands played to fourth street, a win ratio for all hands played to fifth street, a win ratio for all hands played to sixth street, a win ratio for all hands played to seventh street, a play decision ratio of the number of hands played to fourth street to the number of hands played to seventh street, and a raise ratio for all raising hands held by the player.

26. The method as claimed in claim 23 in which the variation is Five Card Stud and in which the number of secondary statistics is derived as any one or more of a win ratio for all hands played to the third street, a win ratio for all hands played to fourth street, a win ratio for all hands played to the fifth street, a play decision ratio of the number of hands played to third street to the number of hands played to fifth street, and a raise ratio for all raising hands held by the player.

27. The method as claimed in claim 23 in which the variation is Five Card Draw and in which the number of secondary statistics is derived as any one or more of a win ratio for all hands played to draw, and a raise ratio for all raising hands held by the player.

28. The method as claimed in claim 23 in which the variation is Manila and in which the number of secondary statistics is derived as any one or more of a win ratio for all hands played to fourth street, a win ratio for all hands played to fifth street, a win ratio for all hands played to sixth street, a win ratio for all hands played to seventh street, a play decision ratio of the number of hands played to fourth street to the number of hands played to seventh street, and a raise ratio for all raising hands held by the player.

* * * * *